Dec. 26, 1961   D. H. MASH   3,015,035
DEVICES EMPLOYING ELECTRO-LUMINESCENCE
Filed July 5, 1956
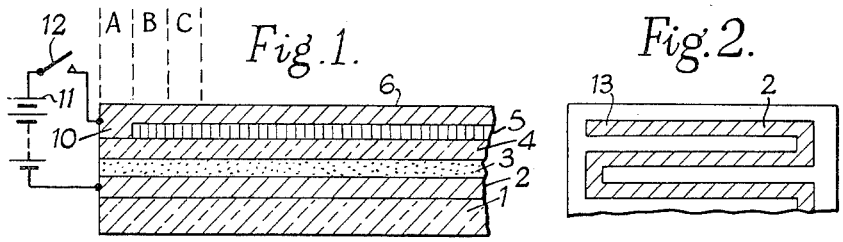
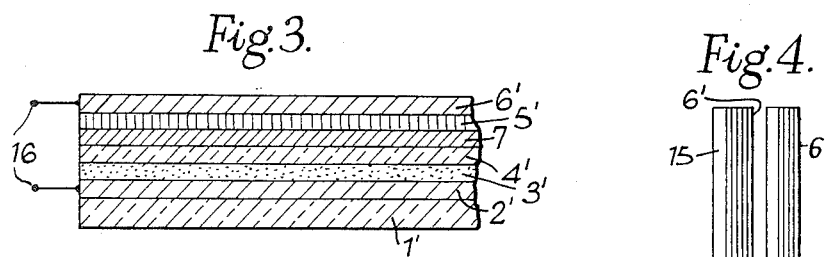
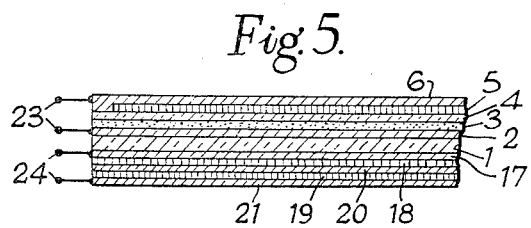
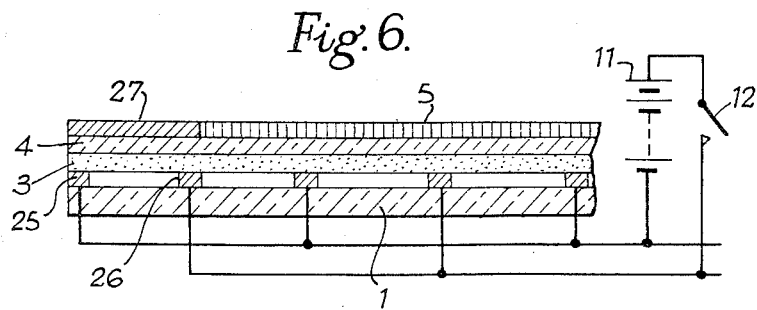
INVENTOR
DEREK HUBERT MASH
BY
ATTORNEY 3,015,035
DEVICES EMPLOYING ELECTRO-
LUMINESCENCE
Derek Hubert Mash, London, England, assignor to Thorn
Electrical Industries Limited, London, England
Filed July 5, 1956, Ser. No. 596,061
Claims priority, application Great Britain July 8, 1955
5 Claims. (Cl. 250—213)

The present invention relates to electro-luminescent devices in which a phosphor is excited to emit light by the application thereto of an electric field. Such devices can be constructed at the present time as area light sources having an intensity of up to 20 foot-lamberts when operating from an A.C. source of 50 c.p.s. at suitable voltages up to about 600.

The present invention is concerned with the production of visual images by scanning: that is to say a process in which the area of illumination travels over the surface of an electro-luminescent screen. Devices of this kind are known which employ a large number of individual electro-luminescent elements which are excited in a desired sequence in order to produce a visual image. Such devices, however, require complicated external electrical or mechanical switching means to effect the sequential excitation.

The principal object of the present invention is to provide an electro-luminescent device in which scanning is adapted to take place automatically and in which the complication of associated external electrical circuits is greatly reduced.

A further object of the invention is to provide novel means employing electro-luminescence for the transmission to a distance and for the reproduction of visual images.

According to the present invention there is provided a panel having a layer of electro-luminescent material and a layer of a photo-conductive material arranged parallel and adjacent to one another and in such a manner that light from the electro-luminscent layer can reach the photo-conductive layer, and electrodes for applying an electric field to the electro-luminescent material, the arrangement being such that the intensity of the said field is increased locally in regions of increased illumination of the photo-conductive material.

Suitable photo-conductive materials are, for example, selenium or cadmium sulphide. The electro-luminescent phosphor is so chosen that its emission is of a colour capable of stimulating the photo-conductor. By providing means for initiating excitation of the electro-luminescent layer in one region, the light-emitting area can be caused to travel or scan from the said region along the layer as will hereinafter be explained. By suitably shaping one or both of the electrodes the path of such scanning can be given a desired shape.

Other features of the invention will be apparent from the following description with reference to the accompanying drawing in which:

FIG. 1 is a much enlarged view in cross-section of a fragment of a panel constituting one embodiment of the invention, FIG. 2 is a front view of a shaped conducting layer that may be used in the embodiment of FIG. 1, FIG. 3 is a view similar to that of FIG. 1 of a panel that may be used with the panel of FIG. 1 according to a feature of the invention, FIG. 4 is a side view of an arrangement comprising panels in accordance with FIGS. 1 and 3, FIG. 5 is an enlarged cross-sectional view of a fragment of another embodiment of the invention suitable for use as a modulator, and FIG. 6 is a view similar to FIG. 1 of yet another embodiment of the invention.

In FIG. 1, a transparent base 1 of glass or plastic carries a layer 2 of transparent electrically conducting material. This layer may be formed on glass by a well-known method involving treating the glass with a tin compound at a temperature near the softening point of the glass. Other known means utilising vacuum evaporation or sputtering may alternatively be used whether the base is of glass or plastic.

Over the layer 2 is a layer 3 consisting of a dispersion of a suitable electro-luminescent phosphor in a dielectric medium covered in turn by a layer 4 of light-transmitting and reflecting material of high dielectric constant, such as that described in the specification of my United States patent application Serial No. 472,193, filed November 30, 1954, for Electroluminescent Lamps. Over the layer 4 is a layer 5 of photo-conductive material, such as cadmium sulphide in the form of a film applied by vacuum deposition or in the form of a layer of powdered photo-conductive material, if necessary with the addition of an inert binder. Other material such as beads of plastic or glass may be incorporated in the layer 5 to modify the electrical or optical properties of the layer. Photo-conducting cadmium sulphide may be prepared in well-known manner. Over the layer 5 is a final layer 6 of conducting material which may be transparent or opaque according to the use to which the device is to be put. The layer may for example be of lead dioxide as described in the specification of my United States application, Serial No. 507,384, filed May 10, 1955, for capacitors and the like.

It will be noted that in a zone marked A the layer 5 is cut short and the layer 6 has a portion 10 extending to the layer 4. A suitable direct voltage source of say, about 500 volts, shown as a battery 11, is connected in series with a switch 12 between the conducting layers 2 and 6.

The device will be assumed to be so constituted and arranged that no light from any external source can reach the layer 5. This layer is, therefore, initially in a highly insulating state. When the switch 12 is closed a pulse of electric field is produced across the electro-luminescent layer 3 in the zone A where the portion 10 of the electrode formed by the layer 6 is close to the electrode formed by the layer 2. This field is localised because of the insulating state of the layer 5. Since the phosphor 3 responds to a change in electric field a flash of light will be emitted thereby.

Much of this light will pass through the transparent electrode 2 and base 1 to the outside, but some will be scattered along the layer 3, owing to its dispersing nature, and will pass through the layer 4 to reach the photo-conductive layer 5 in the neighborhood of the zone A, say in the zone B. The layer 5 in the zone B then becomes partially conducting resulting in the application of a pulse of electric field (of reduced intensity compared with that initially produced in zone A) to the light-emitting layer 3 which emits light feebly. Much of this light will reach the photo-conductive layer 5 in the zone B increasing its conductivity. Thus there is a form of positive feedback which will ensure that the phosphor in this zone rapidly reaches saturation brightness.

As before, some of the light emitted by the phosphor in zone B will be scattered and will reach the photo-conductive layer in the zone C which will then behave in the manner described for zone B. In this way the photo-conductive layer 5 will become conductive progressively proceeding away from the zone A and as it does so the phosphor nearest to the conductive zones will emit light.

While the process described is taking place another effect will occur and will be described with reference to the zone B. When the photo-conductive layer 5 in this zone becomes conducting, a unidirectional pulse of electric field is generated in the light-emitting layer 3 in this zone which therefore emits light. Once this pulse has passed on, the voltage applied to the phosphor in the zone B becomes steady and the phosphor ceases to emit light, since light is emitted by the phosphor (when as described in a dielectric medium) only in response to a change in the voltage. Consequently a pulse of increasing electric field will pass over the device in a direction away from the zone A and light will be emitted only from the region where, at any instant, this pulse is occurring. Thus from the moment of closing the switch 12 a spot of light will travel along the device away from the zone A.

The rate of movement of the spot of light will depend upon many variables, including the magnitude of the voltage, the time-constant of the photo-conductive layer, the build-up and decay periods of the electro-luminescent layer, and the amount of dispersion of the light in the layers 3 and 4. Of these, the time-constants of the photo-conductive and electro-luminescent layers are determined by the methods used in their manufacture, the dispersion is governed by the thickness and nature of the phosphor layer 3 and of the layer 4, while the voltage is, of course, variable at will.

If full scanning coverage is required over, say, a square panel, the scanning path may be defined by suitably shaping one of the electrodes 2 or 6. Thus, as shown in FIG. 2, a zig-zag path may be obtained by shaping the electrode 2 as shown, the light spot then following this zig-zag path from the end 13 which lies opposite to the portion 10 of the layer 6 in FIG. 1. It will be evident that by suitably shaping one or both of the electrodes, the light spot can be arranged to traverse a tortuous path of any other shape.

Clearly it is necessary to prevent scattered light from the light spot on one line from activating a neighbouring region in the line adjacent to it. This may be done by leaving a sufficiently wide gap between the lines to avoid feedback, or by electrically isolating strips of one or both electrodes (each strip corresponding to a line) from the others (instead of having them continuous, as shown) and applying the voltage only to one strip at a time. The strips may be energized in succession by switching means operating either electrically or mechanically.

Further, when the light spot has completed a single scan of the whole plate, the entire process may be repeated by re-energising the first strip, or it may return on an interlaced zig-zag.

One use to which a panel as described with reference to FIGURES 1 and 2 can be put is to provide an illuminated sign, one or both of the electrodes 2 and 6 may be given a desired shape, such as that of a written word. The scanning can be arranged to take place as slowly as may be desired. By applying an alternating voltage between the electrodes 2 and 6, instead of a direct voltage, the initial spot of light will develop into a line of light following the path determined by the shape of the electrodes.

In order to produce a visual image under the control of an applied signal there may be used with the panel of FIG. 1 a second panel arranged as shown in FIG. 3. In FIG. 3 layers corresponding to those in FIG. 1 are given the same reference number with a dash superscript.

In FIG. 3 the layer 6' is of transparent conducting material and an opaque layer 7 may be included to prevent light from the phosphor layer 3' from reaching the photo-conductive layer 5'. The panels constructed as in FIGS. 1 and 3 are arranged as shown in FIG. 4, and are indicated at 14 and 15 respectively. The two panels need not be separate as shown in FIG. 4 but may be built up as a single structure.

Assuming that the panel 14 is operated as described to produce a spot of light scanning over its surface, this light will pass through the layer 6' of the panel 15 and render the photo-conductive layer 5' conducting in a region immediately opposite the light spot. If a unidirectional voltage be applied between terminals 16 (FIG. 3) the layer 3' will be excited to emit light immediately opposite the light spot from the panel 14. By modulating the voltage applied to the terminals 16 with an applied signal the intensity of the light emitted by the layer 3' can be varied from point to point during the scanning in dependence upon the signal.

The modulating signals can be derived in any known manner. A novel method of generating such signals in accordance with the invention will, however, be described with reference to FIG. 5.

In FIG. 5 there is used a panel constructed in accordance with FIG. 1 and having over the transparent base 1 a transparent conducting layer 17, two photo-conductive layers 18 and 19 separated by an opaque layer 20, and a transparent conducting layer 21. The layer 20 may be non-conducting but may be made partially conducting provided that the conduction between spaced points therein is negligible.

Terminals 23 are energised as described with reference to FIG. 1 to cause a spot to scan over the layer 3. An image of a subject to be transmitted is formed by a lens 22 on the photo-conductive layer 19 and light from the scanning spot generated in the layer 3 falls on the photo-conductive layer 18. The resistance between terminals 24 connected to the layers 17 and 21 will be determined by the brightness of the image formed by the lens 22 at the region at any instant opposite the scanning spot. In regions away from the scanning spot the resistance will be very high irrespective of the brightness of the image on the layer 19. The terminals 24 may, therefore, be connected in series with the terminals 16 in FIG. 4 and with a suitable direct voltage source, and an image corresponding to that formed by the lens 22 will then be formed in the panel 15 in FIG. 4. The modulations at terminals 24 may, of course, be transmitted by wire or radio to a remote point at which the apparatus of FIG. 4 is arranged as a receiver. If the layer 20 is non-conducting and if the speed of scanning is insufficient to produce an adequate signal between the terminals 24, an alternating potential, preferably of a high frequency, may be applied in series with the output between the terminals 24.

Suitable known means may be provided to synchronise the scanning in the panel of FIG. 5 with that in the panel 14 in FIG. 4.

In FIG. 1 the layer 4 can be omitted in some cases.

FIG. 6 shows a modification of the device in FIG. 1. The electrode 6 is omitted and the electrode 2 is divided into a number of separate elements. The elements 25 of one set are connected together and to one terminal of the battery 11 and the alternate elements 26 are connected together and through the switch 12 to the other terminal of the battery. A conducting strip 27 is provided at one end of the layer 5 and is wide enough to overlap at least two of the elements 25, 26. This device operates in the same way as that in FIG. 1 excepting that the current has to travel from an element 25 to the strip 27 and back to an element 26. Consequently the voltage needs to be higher than in the device of FIG. 1. The strip 27 performs the same function as the portion 10 in FIG. 1.

I claim:

1. A panel comprising a first layer of electroluminescent material, a second layer of photoconductive material disposed parallel and adjacent to said first layer and positioned to receive light from said first layer, electrode means positioned to apply an electric field to said first layer, said means comprising two electrodes in the form of electrically conducting layers, at least one of said electrodes being located closer to the other in one region of the surfaces thereof than at other regions of said surfaces in order to increase said electric field in one region of said first layer in relation to other regions of said first layer.

2. A panel according to claim 1, wherein said electrode means comprise two electrodes in the form of electrically conducting layers, at least one of said electrodes being of tortuous shape, thus defining a tortuous shape for said region.

3. A panel according to claim 1 in combination with a second panel, said second panel comprising a third layer of electro-luminescent material, a fourth layer of photo-conductive material disposed parallel to and adjacent to said third layer, and two conducting layers disposed with said third and fourth layers between them, said fourth layer being disposed to receive light from said first layer.

4. A combination according to claim 3 comprising an opaque layer between said third and fourth layers.

5. A modulator comprising a first layer of electro-luminescent material, a second layer of photo-conductive material disposed parallel and adjacent to said first layer and positioned to receive light from said first layer, two electrically conducting layers disposed with at least part of said first layer between them, a third and a fourth layer of photo-conductive material, said third layer being disposed to receive light from said first layer, an opaque layer between said third and fourth layers, electrode means for establishing an electric field traversing said third and fourth layers, a light source, and means for directing light from said source upon said fourth layer.

References Cited in the file of this patent

UNITED STATES PATENTS

| | | |
|---|---|---|
| 2,698,915 | Piper | Jan. 4, 1955 |
| 2,768,310 | Kazan et al. | Oct. 23, 1956 |
| 2,773,992 | Ullery | Dec. 11, 1956 |
| 2,874,308 | Livingston | Feb. 17, 1959 |

FOREIGN PATENTS

| | | |
|---|---|---|
| 157,101 | Australia | June 16, 1954 |